United States Patent
Doll

(10) Patent No.: US 9,038,842 B2
(45) Date of Patent: May 26, 2015

(54) STORAGE COMPARTMENT

(75) Inventor: Volker Doll, Ranschbach (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 203 days.

(21) Appl. No.: 13/510,833

(22) PCT Filed: Nov. 19, 2010

(86) PCT No.: PCT/EP2010/007277
§ 371 (c)(1),
(2), (4) Date: Jul. 30, 2012

(87) PCT Pub. No.: WO2011/060963
PCT Pub. Date: May 26, 2011

(65) Prior Publication Data
US 2012/0318796 A1 Dec. 20, 2012

(30) Foreign Application Priority Data
Nov. 20, 2009 (DE) .......................... 10 2009 055 678

(51) Int. Cl.
*B65D 43/26* (2006.01)
*B60R 7/00* (2006.01)
*B60R 7/06* (2006.01)
*B60R 11/00* (2006.01)

(52) U.S. Cl.
CPC ........... *B60R 7/06* (2013.01); *B60R 2011/0005* (2013.01); *B60R 2011/0007* (2013.01); *B60R 2011/0087* (2013.01); *B60R 2011/0094* (2013.01)

(58) Field of Classification Search
CPC ............ B60R 7/06; B60R 7/04; B60R 11/00; B60R 11/02; B60R 13/00; B65D 43/26

USPC ......... 220/830, 264, 263, 262, 827, 825, 810, 220/345.1, 345.4; 296/24.34, 37.8; 224/483; 16/354
See application file for complete search history.

(56) References Cited

U.S. PATENT DOCUMENTS 7,063,225 B2 * 6/2006 Fukuo ........................... 220/264
2003/0080131 A1 5/2003 Fukuo
2012/0061983 A1 3/2012 Seiller et al.

FOREIGN PATENT DOCUMENTS

DE           20005552       6/2000
DE        102005052030 A1   5/2007
GB            1163998       9/1969

OTHER PUBLICATIONS

International Search Report for PCT/EP2010/007277, Feb. 28, 2011, 2 pages (translated).

*Primary Examiner* — Andrew Perreault
(74) *Attorney, Agent, or Firm* — Reising Ethington P.C.

(57) ABSTRACT

The invention relates to a storage compartment comprising a storage space, a cover flap (3) covering the opening (5) of the storage space, said flap releasing the opening (5) in an opened position and closing it in a closed position, and a mechanism (4) for opening and closing the cover flap, wherein the mechanism comprises a first coupling rod (40) that is mounted on a first pivot rotatably about a first axis (41) in the storage space and comprises a second pivot spaced from the first pivot, and a lever (30) arranged rigidly on the cover flap is mounted on the second pivot rotatably about a second axis (42). According to the invention, a gear wheel section (33) that is in engagement with a further rotatably mounted gear wheel (44) is present on the cover flap, wherein the gear wheel is also arranged on the coupling rod.

5 Claims, 4 Drawing Sheets

STORAGE COMPARTMENT

TECHNICAL FIELD

The subject matter of the present invention is a storage compartment such as may be used in vehicle interiors.

BACKGROUND

Storage compartments are to be found in almost every motor vehicle or lorry, in particular in the vehicle interior. The storage compartments mostly have a storage space and a cover flap which closes this. The cover flap merges into the surrounding surfaces and is mostly only recognisable by way of the contours or an opening button or grip, depending on whether the storage compartment is arranged in the instrument panel, the middle console or the doors.

The mechanism for opening and closing the cover flap is given particular attention. Here, many different ideas are to be found in the state of the art. Thus for example the document DE 200 05 552 U1 shows a storage compartment with a storage space as well as with a cover flap which covers the opening of the storage space, releases the opening in an opened position and closes it in a closed position. The opening and closing of the cover flap is created via a mechanism, wherein the mechanism amongst other things comprises a first coupling rod which at a first rotation point is arranged in a rotatably mounted manner about a first axis (first pivot) in the storage space and a second rotation point which is distanced to the first rotation point, wherein a lever rigidly arranged on the cover flap is rotatably mounted about a second axis (second pivot), at the second rotation point. Moreover, further levers are arranged on the coupling rod as well as on the cover lap, in order to permit a suitable opening of the previously mentioned cover flap, wherein parts of the mechanism are led in a sliding guide path and thus permit a defined opening and closure of the device. The sliding guide path is necessary amongst other things, in order to permit a simultaneous lateral displacement of the cover flap and a rotation of the cover flap to an opened position.

Lateral storage space or storage space directed to the opening is lost by way of the presence of several connections between the mechanism and the flap. Moreover, a large part of the mechanism is viewable from the outside in the opened condition.

One of the objects of the present invention is to design the mechanism for opening and closure of the cover flap in a simple and space-saving manner. This object is achieved by a storage compartment with the features claim 1.

SUMMARY

The lever rigidly arranged on the cover flap and which is rotatably mounted about a second axis, comprises a cog section, preferably with outer teeth, in the region of the second rotation point (second pivot or fulcrum). This cog section meshes with a further rotatably mounted cog. In this manner, it is possible combine a lateral swinging open, as is possible for a rotatably mounted, but rigid lever, with a targeted rotation movement for rotating up the lever, during the lateral swinging open.

For this the further cog which meshes with the cog section of the lever, is either set directly or indirectly into motion.

The further rotatably mounted cog is thereby arranged on the coupling rod, so that a fixed spatial alignment of the cog section on the lever and of the rotatably mounted cog is possible and preferably given.

The lateral movement of the cover flap thereby is effected essentially by the rotation of the coupling rod, from a closed position into an opened position. This rotation movement of the coupling rod is superimposed on a rotation movement of the cog, which increases the angle between the cover flap in the closed condition and the cover flap in the opened condition, in order thus to permit an improved reaching of the contents of the storage space.

Thereby, the desired angle on the one hand can be set via the radius of the further cog and the radius of the cog section. Hereby however, one is to note that configurations slightly different to the circular shape are possible in the region of the cog section.

A further advantage of the suggested solution of a mechanism is that a connection is only necessary between the cover flap and the coupling rod. Hereby, the term "a connection" is to be understood to the extent than only one connection is necessary for each coupling rod. Of course, it is possible to equip the cover flap with several rigid levers which are connected in each case to a coupling rod and are preferably each arranged at the edge of the cover flap. The lever which can represent the single connection to the cover flap, seen from the opening can be displaced to the rear. In this manner, the mechanism takes up only little space, so that the opening or the storage space available can become larger compared to other solutions.

Seen as a whole, the radius of the further cog as well as the distance of the first rotation point (first pivot or fulcrum) to the second rotation point of the coupling rod and the tooth distance of the further cog or of the cog section dictate how large the opening angle of the cover flap turns out compared to a purely lateral displacement.

Further design forms are specified in the dependent or auxiliary claims, wherein individual features of the individual claims can be combined with one another.

In one embodiment, the cover flap is distanced to the cog section by the lever. The size of the distance of the lower side of the cover flap and the next point of the cog section is at least one diameter of a circle assignable to the cog section. In the case that the cog section is designed in an elliptical manner, the distance is at least the distance of the minor half-axis of the ellipse. The effect of this is that a large part of the moving components of the mechanism for opening and closing or of the opening and closing mechanism is less visible to the user in the opened condition of the cover flap, covered by the side walls of the storage space or remains in the storage space itself.

In one possible variant, the further cog at the first rotation point is arranged coaxially to the first axis (first pivot). With a movement of the coupling rod in the anticlockwise direction, the further cog must also be moved in the anticlockwise direction, in order to effect a movement of the cog section in the clockwise direction and thus to permit a simultaneous lateral displacement and rotation of the cover flap.

The translation ratio between the cog and the cog section is between 1.5:1 and 1:1. One achieves a particularly pleasant ratio between a lateral displacement and rotating movement of the cover flap on opening this, by way of this.

As an alternative to this, the further rotatably mounted cog at a third rotation point (third pivot or fulcrum) of the first coupling rod is rotatably arranged about a third axis (third pivot), wherein the third axis is different to the first and second axis. By way of this, a smaller radius of the further cog and thus a space-saving embodiment of the mechanism can be realised.

The translation ratio of the further cog to the cog to the cog section is preferably 1.7:1, 3:1 to 1.7:1, 1:1 or 1.4:1, 1:1.

In an alternative embodiment, it is possible to arrange a stationary cog which lies coaxially to the first axis and on which the further cog rolls, so that on moving the coupling rod in the clockwise direction or opposite to this, a movement of the further cog in the same direction as the coupling rod is effected due to the rolling of the farther cog on the stationary cog. This embodiment has the advantage that only one movement, either a movement of the coupling rod or a movement of the further cog, needs to be effected. On account of the fixed distances and the stationary arrangement on the coupling rod, the movement either of the coupling rod or of the further cog leads to the non-actively moved component of the two previously mentioned components also moving in the desired way and manner.

A push-push mechanism or similar mechanism can be applied for opening the storage compartment. By way of the opening of the cover flap, a complete opening of the storage compartment can be achieved either via an electrical drive which acts on the coupling rod or the further cog, and/or a spring element which with the relaxation of the spring leads to an opening of the cover flap. It is also possible to effect the opening for example via a torsion spring which for example is arranged in the region of the cog section or of the further cog. The electrical drive, the spring element or similar equally acting elements are hereinafter indicated as movement guide devices or means for the guided movement of the cover flap and generally effect an automatic opening of the cover flap after the actuation of a locking mechanism such as for example a push-push mechanism. This in particular means that on actuation the locking mechanism given a closed position of the cover flap, the movement guide device effects an automatic moving of the cover flap into the opened position.

In a further embodiment, a holder is present in the storage space and this at a holding point is arranged in a rotatably mounted manner about a rotation axis which is hereinafter indicated as the tumble axis. The holder thereby comprises a contact point which lies opposite the holding point, i.e. is remote from the tumble axis, and delimits the holder at an end which is away from the tumble axis. Amongst other things, navigation apparatus or a multimedia apparatus can be applied into the holder.

Since the holder is rotatably mounted, this for example can be rotatingly sunk into the storage space for example in the same direction as the coupling rod. On opening the storage space, the holder rotates about the tumble axis in the same direction as the coupling rod, i.e. a parallel alignment of the tumble axis and the first axis to one another is preferred. Other embodiments however are also conceivable, in which the holder is rotated in the direction to the coupling rod, which is opposite to the movement direction of the coupling rod.

In one variation of this embodiment, the contact point contacts a lower side of the cover flap, wherein the contact point preferably lies on a curved surface of the holder. On folding open the cover flap, the holder can slide along the surface of the cover flap. Likewise, after opening the cover flap, i.e. by way of actuating for example a push-push mechanism, a torsion spring arranged in the region of the holding point of the second or third rotation point can press on the cover flap since the contact point presses from below onto the lower side of the cover flap.

In a third embodiment, the storage compartment comprises a second coupling rod which at the first rotation point is arranged in a rotatably mounted manner about the first axis in the storage space, wherein the second coupling rod is actively connected to the holder, so that a rotational movement of the holder can be initiated on actuating the mechanism for opening and closing the cover flap. Hereby, the variant is given, with which the second coupling rod moves independently or depending on the first coupling rod and in the region of the holding point comprises a cog section which meshes into a cog arranged coaxially about the tumble axis.

A plastic can be applied as a material for the cover flap, the lever, the cogs or the coupling rod. In particular, the cover flap and the lever arranged thereon can for example be manufactured of polypropylene or of another plastic, preferably of one piece. Metals can also be applied for the coupling rod and the gearwheels.

The storage space preferably comprises a volume of less than 100 l.

BRIEF DESCRIPTION OF THE DRAWINGS

The invention is hereinafter explained in more detail by way of different embodiment examples. There are shown in.

DESTAILED DESCRIPTION OF THE ILLUSTRATED EMBODIMENT(S)

Figure 1:
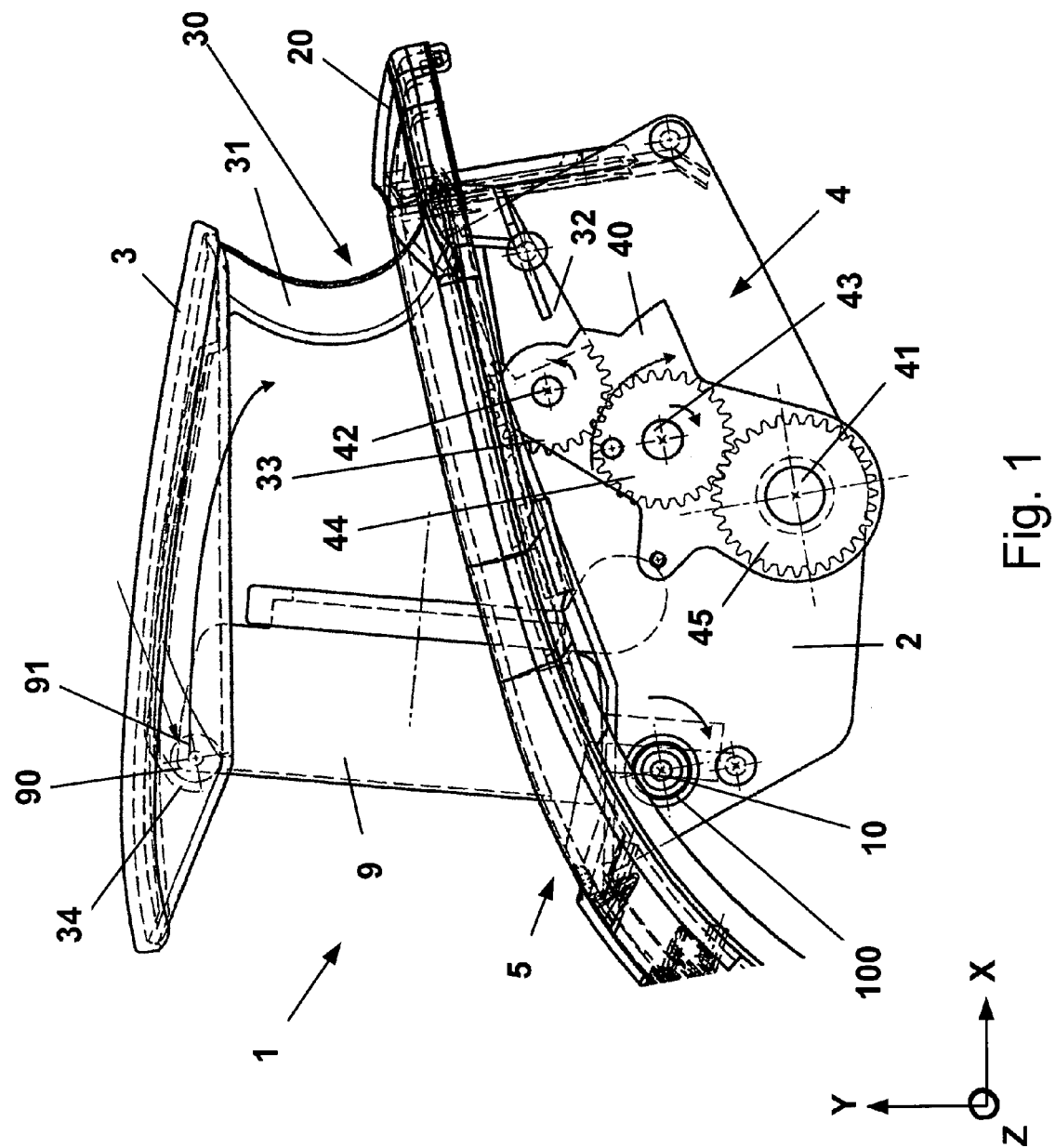
FIG. 1 a first embodiment example in the opened condition.

FIG. 1 shows a first embodiment example of a storage compartment. The storage compartment 1 comprises a storage space 2 which can be formed by way of an independent housing or by way of a recess in the carrier 20 delimiting the storage space 2. A cover flap 3 is present covering the storage space 2 and can be opened and closed via a mechanism 4. Thereby, the opening 5 which is limited by way of the surrounding carrier 20, is opened or closed. A lever 30 which is composed of a curved middle piece 31 and a continuation 32 is arranged on the cover flap 3. The curved middle piece 31 is thereby shaped in a concave manner seen in the x-direction. By way of this, it is possible to enlarge the storage space available for the use, without enlarging the storage space 2 or the opening 5 itself. A cog section 33 is located at the end of the continuation 32. The lever 30 is connected to a coupling rod 40.

The coupling rod 40 is rotatably mounted about a first axis 41. At the same time, the coupling rod 40 comprises a second axis 42 which is distanced to the first axis 41 and about which the lever 30 is rotatably mounted. The cog section 33 moreover meshes into a further cog 44 which is rotatably mounted about a third axis 43. The further cog 44 engages into the stationary cog 45 which is arranged coaxially to the first axis 41.

Figure 2:
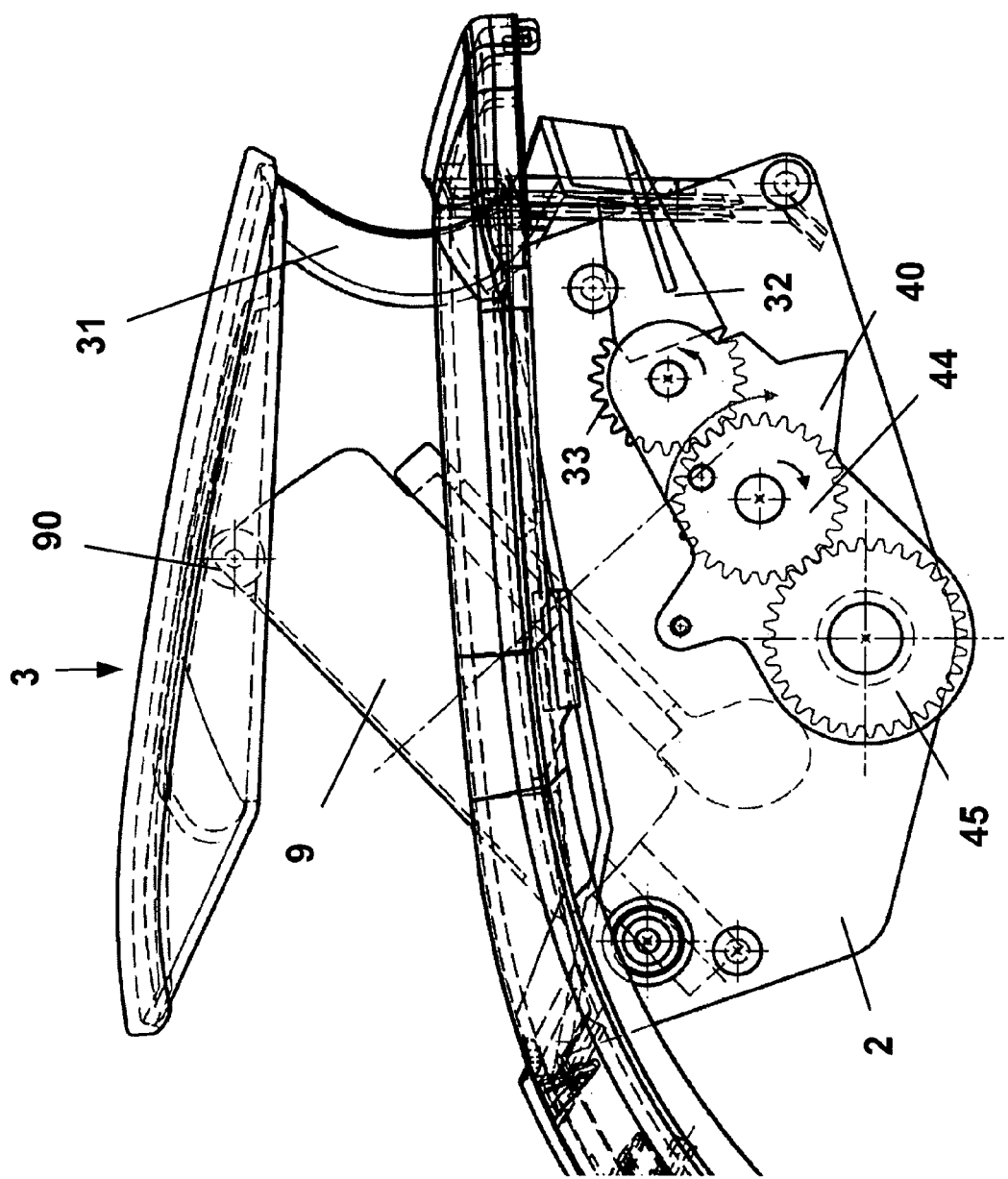
FIG. 2 a first embodiment in the half-closed condition.
Figure 3:
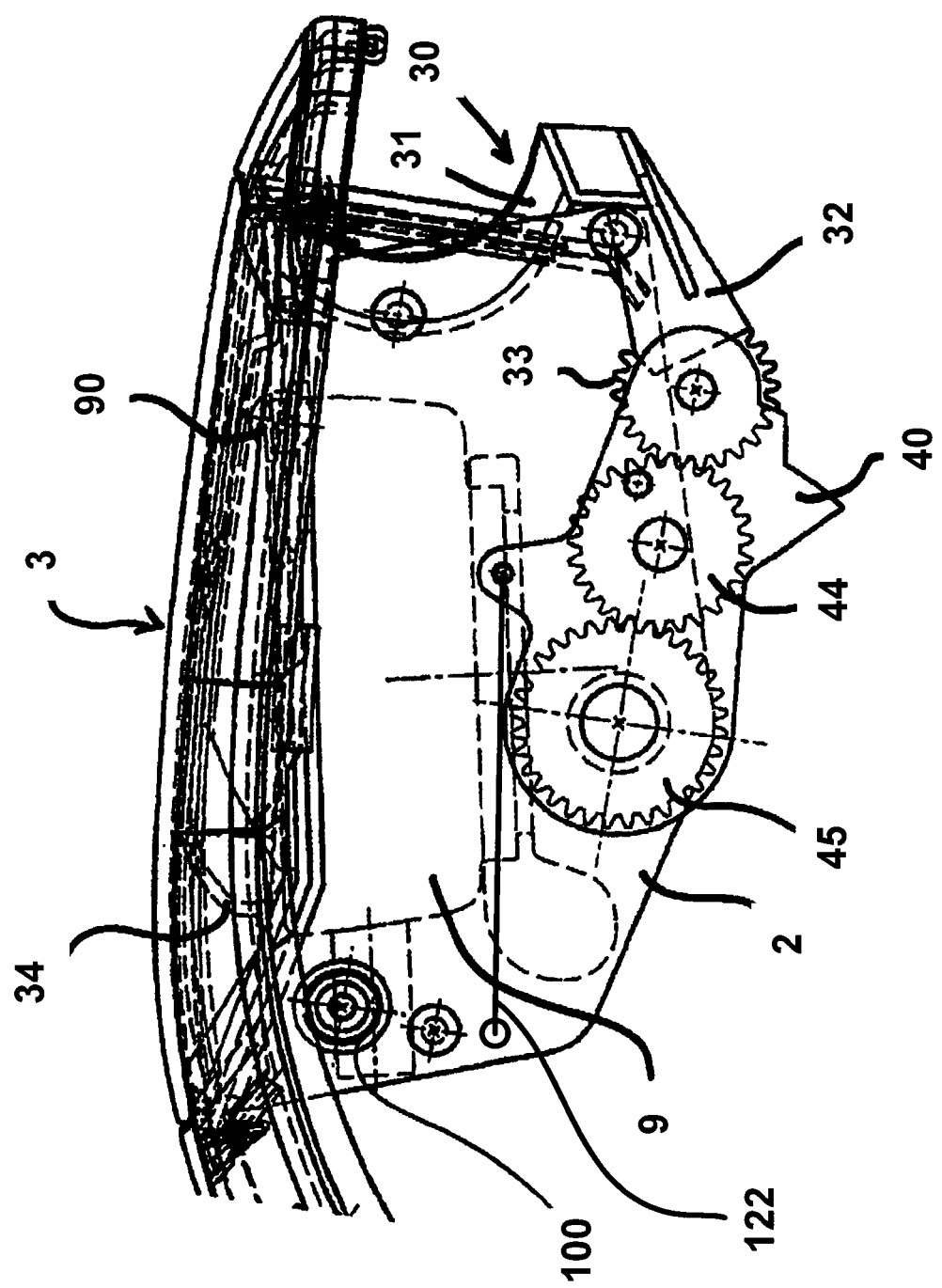
FIG. 3 a first embodiment in the closed condition.

On closure of the cover flap 3, as can be recognised from the sequence in FIGS. 1 to 3, the further cog 44 rolls in the clockwise direction on the stationary cog 45. The rolling movement is transmitted via the rigid lever 30 and the movement exerted onto the cover flap 3 entailed by this, in the anticlockwise direction. This means that the movement of the cog section 33 and thus of the complete cover flap opposite to the rotation movement direction of the coupling rod is effected, so that the angle between the cover flap and the carrier 20 can be successively reduced on closure of the storage compartment.

Moreover, a holder 9 is represented in FIG. 1, in which a navigation apparatus or a multimedia apparatus can be inserted. Hereby, electrical contactings for an electricity supply or for a connection to the on-board computer of the vehicle can be present in the region of the storage space 2 or holder 9. The holder 9 is rotatably mounted about a tumble axis 10 which is arranged on a holding point of the storage space 2. The holder at the end of this which lies opposite in the y-direction comprise a contact point 90 in the form of a moving wheel, wherein the contact point 90 is actively connected to the lower side of the cover flap 3. For this, the cover flap 3 comprises a recess which is closed to the sides in the z-direction, so that a lateral slippage of the cover flap is not possible. Moreover, the cover flap 3 at its end of the recess which lies opposite in the x-direction, comprises a semi sliding guide 34 which receives the wheel 91 and at the same time prevents the holder 9 from being able to rotate further in the anticlockwise direction on opening. The movement of the holder 9 is effected by way of a torsion spring which is arranged in the region of the tumble axis 10. This leads to the fact that on operating a push-push mechanism which is not shown but which is known from the state of the art, the cover flap 3 is released from its anchoring and by way of the tension of the torsion spring 100 which effects a movement of the holder 9 in the anticlockwise direction, is pressed upon, since the wheel 91 runs along on the lower side of the cover flap 3. Of course, it is optionally possible to attach sliding links for the contact point 90, in the region of the cover flap 3.

A tension spring or a cable-winch-like motor which pulls the coupling rod 40 downwards for closure of the cover flap 3 and thus effects a lateral movement and a rotation movement of the cover flap 3 in the anti-clockwise direction, can be arranged in the region of the coupling rod 40.

As is evident from FIGS. 2 and 3, the translation between the cog section 33 and the further cog 44 as well as the stationary cog 45 is selected in a manner such that in dependence on the distance of the first and second axis, the cover flap 3 on closing this executes a slight rotation movement directed in the anticlockwise direction and a lateral movement in the negative y-direction. Thereby, the advantage of the curved middle piece 31 of the lever 30 can in particular be clearly seen from FIG. 2. By way of the movement of the coupling rod, the cover flap is moved to the rear in the x-direction, so that with the help of the curved middle piece, an optimal utilisation of space within the storage space can be effected. Moreover, it can be clearly recognised that a large part of the rotation movement only takes place when the cover flap has already been almost brought into the closed condition shown in FIG. 3.

Other meshing components which execute concentric movements can also be applied alternatively to the cogs.

Figure 4:
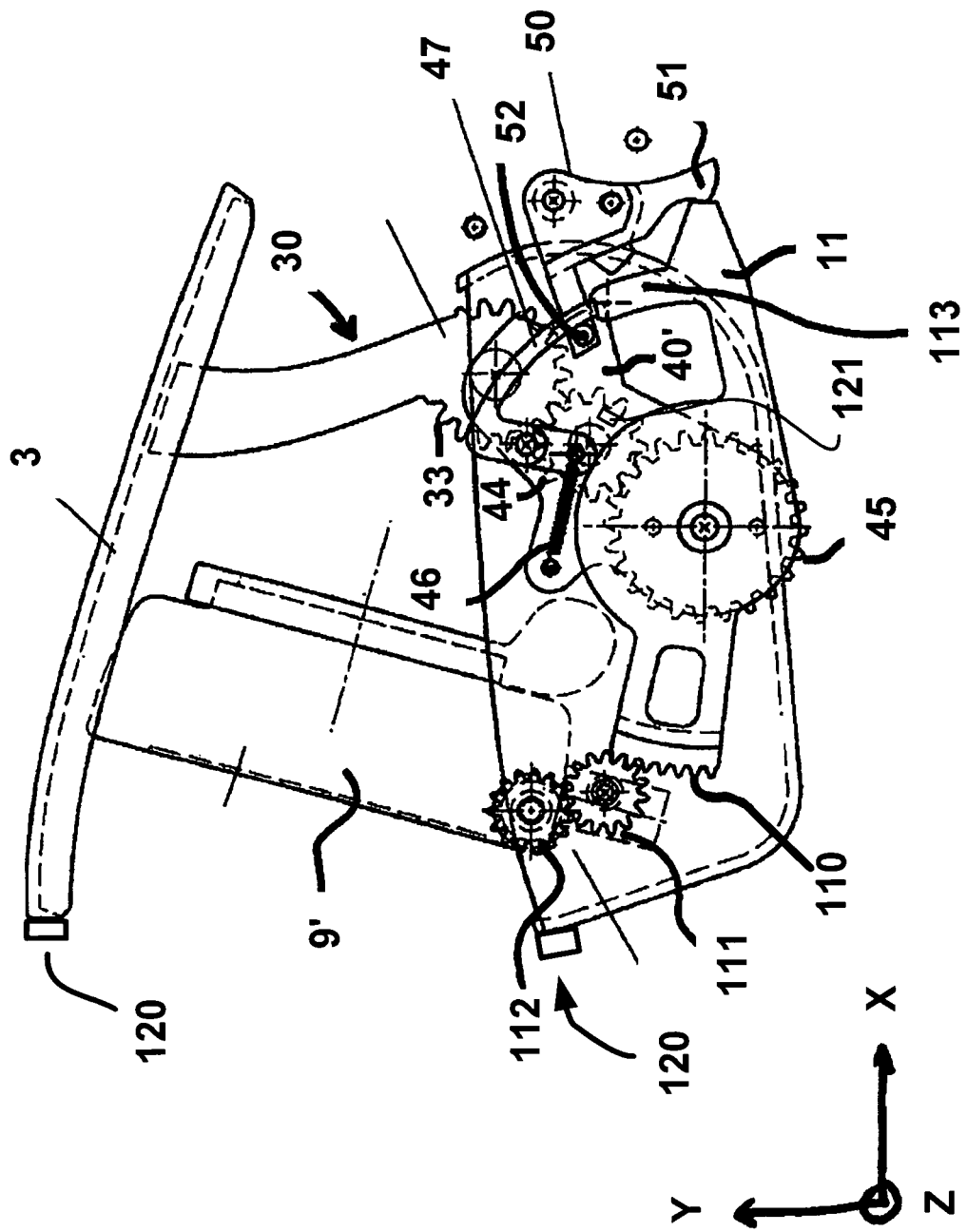
FIG. 4 a second embodiment example in the opened condition.

A second embodiment example of the storage compartment according to the invention is shown in FIG. 4. The same components or components with the same functions are provided with the same reference numerals. Apart from the already mentioned components, a further second coupling rod 11 is present, which as the first coupling rod 40', at the first rotation point, is arranged in a rotatably mounted manner in the storage space about the first axis 41. The second coupling rod 11 at its end which lies in the negative x-direction comprises a cog section 110 which meshes with a cog 111. The cog 111 is attached in a stationary manner and is not rigidly connected to the second coupling rod. By way of the rotation of the second coupling rod 11, a movement of the second cog 112 is effected, so that the holder 9' is lowered in the clockwise direction in the storage space 2. With the present embodiment example, it is not necessary for the holder to be in connection with the lower side of the cover flap via a contact point, since the mechanism guided via the coupling rod 11 is sufficient for the retraction of the holder.

At the same time, an active connection between the coupling rod 40' and the second coupling rod 11 is given. Thus the coupling rod 40' comprises a lever 47 which is held with a tension spring 46 and which is supported in a continuation 113 of the second coupling rod 11. On closure of the cover flap 3, now the lever 47 presses onto the coupling rod 11 and thus lowers the holder 9'. Thereby, the translation is effected in a manner such that the holder 9' is sunk significantly more quickly into the storage space than the cover flap 3. With a movement of the second coupling rod 11 in the clockwise direction, a movement of a block 50 is also effected. If the second coupling rod 11 now sinks decisively in the negative y-direction, the block 50 arranged on the continuation 51 is no longer held by the second coupling rod 11, and the continuation 51 executes a movement in the negative x-direction in a manner such that the lever 47 is no longer engaged with the second coupling rod 11. This is effected by a continuation 52 of the block 50 which is formed in the z direction and which lifts the lever 7 from the continuation 113. By way of this, a decoupling of the movement of the second coupling rod 11 and the first coupling rod 40 takes pace. Moreover, thus it is only the cover flap which yet closed, since at this point in time the holder is already located in the retracted position.

Moreover, a locking mechanism 120 is present, which for example is designed as a push-push mechanism. A movement guidance device 121 after the actuation of the locking mechanism 120, effects a movement of the cover flap from the closed into the opened condition. In the embodiment example of FIG. 4, with regard to the movement guidance device it is the case of a motor which drives the cog 44. Alternately, a tension spring 122 as is drawn in FIG. 3 can be applied for the automatic opening of the cover flap (after release of the locking). A locking mechanism which is not shown in more detail in FIG. 3 is actuated and the bias of the spring 122 effects a rotation of the coupling rod in the anticlockwise direction to the position shown in FIG. 1.

The invention claimed is:
1. A storage compartment, comprising:
a storage space having an opening;
a cover flap which covers the opening of the storage space in a closed position and reveals the opening in an opened position; and
a mechanism for moving the cover flap between the opened and closed positions;
wherein the mechanism comprises a first coupling rod which at a first rotation point is arranged in a rotatably mounted manner about a first axis in the storage space;
wherein the mechanism comprises a second rotation point distanced from the first rotation point, a lever being rigidly arranged on the cover flap at the second rotation point, the lever being rotatably mounted about a second axis; and
wherein the lever comprises a cog section in a region of the second rotation point, said cog section meshing with a further cog which is rotatably mounted on the first coupling rod and is arranged on the first coupling rod, wherein the further cog is rotatably mounted at a third rotation point of the first coupling rod and is rotatably arranged about a third axis, wherein the third axis is different from the first axis and from the second axis.
2. The storage compartment according to claim 1, characterized in that the third axis is arranged parallel to the first axis and distanced from the first axis, and a stationary cog is arranged coaxially to the first axis and meshes with the further cog.
3. The storage compartment according to claim 1, characterized in that the first coupling rod is connected to a restoring element.

4. The storage compartment according to claim 1, characterized in that a holder is present, which in the storage space at a holding point is arranged in a rotatably mounted manner about a tumble axis and comprises a contact point delimiting the holder.

5. The storage compartment according to claim 4, characterized in that the contact point contacts a lower side of the cover flap, wherein the contact point preferably lies on a curved surface of the holder.

* * * * *